UNITED STATES PATENT OFFICE.

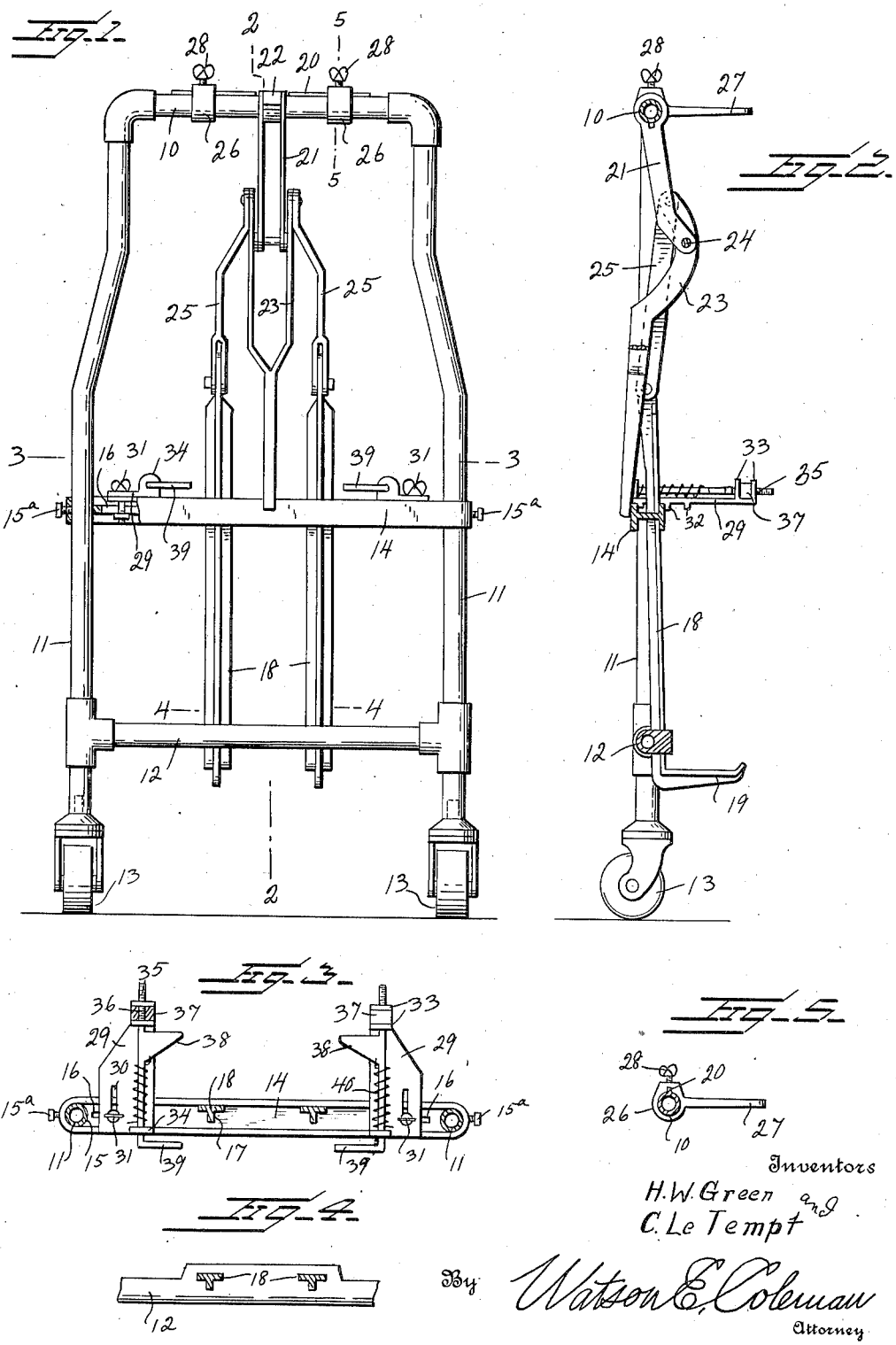

CHARLES LE TEMPT AND HENRY W. GREEN, OF HARRISBURG, ILLINOIS.

CARRIAGE FOR RADIATORS.

1,303,691. Specification of Letters Patent. Patented May 13, 1919.

Application filed February 21, 1919. Serial No. 278,523.

*To all whom it may concern:*

Be it known that we, CHARLES LE TEMPT and HENRY W. GREEN, citizens of the United States, residing at Harrisburg, in the county of Saline and State of Illinois, have invented certain new and useful Improvements in Carriages for Radiators, of which the following is a specification, reference being had to the accompanying drawings.

This invention relates to devices for carrying objects from one place to another, and particularly to trucks or small carriages for handling and shifting various mechanisms.

The general object of this invention is to provide a carriage as it may be termed, which may be engaged with a radiator and used for the purpose of transporting or shifting the radiator from place to place without the necessity of the radiator being lifted by hand.

A further object is to provide a device of this character whereby radiators may be shifted around a factory and whereby they may be shifted over waxed floors without damaging the floor.

Still another object is to provide a construction of this character embodying hook-shaped members adapted to engage beneath a radiator and vertically movable to raise or lower the radiator by means of a lever, and in this connection to provide a construction wherein when the radiator is fully raised from the floor, the lever will be locked automatically to prevent a downward movement of the radiator and the hook-shaped members.

Still another object is to provide a carriage as above referred to, with means for engaging and lifting the radiator, and means for locking the end of the radiator to the carriage, and in this connection to make said locking means adjustable so as to fit radiators whose coils are spaced at different distances from each other, or where the size of the coils may vary.

Our invention is illustrated in the accompanying drawings, wherein:—

Figure 1 is a front elevation of our improved carriage;

Fig. 2 is a vertical section on the line 2—2 of Fig. 1;

Fig. 3 is a section on the line 3—3 of Fig. 1;

Fig. 4 is a fragmentary section on the line 4—4 of Fig. 1; and

Fig. 5 is a transverse section on the line 5—5 of Fig. 1.

Referring to these drawings, it will be seen that this truck or carriage comprises a frame including an upper cross bar 10, the downwardly depending legs 11, and the lower cross bar 12. These cross bars are connected to the legs by elbows, as the frame may be most conveniently made of metal pipe. It is obvious, however, that the frame might be cast in one piece or otherwise formed. The lower ends of the legs carry the caster wheels 13, preferably mounted on ball bearings.

Disposed between the upper cross bar 10 and the lower cross bar 12 and at any convenient height, is a cross bar 14 which may be made adjustable upon the legs 11. Thus this cross bar 14 may be formed as illustrated with openings 15 at its ends, through which the legs 11 pass and with set screws 15[a] passing through the walls of these openings and engaging the legs so that the cross bar may be adjusted. On the other hand, in many cases, it is not necessary to have this cross bar adjustable and it may remain permanently in one position on the legs. This cross bar as illustrated is T-shaped, the hollow portion of the cross bar being directed downward and the cross bar is provided adjacent its ends with the longitudinal slots 16, and intermediate these ends with the short parallel T-shaped slots 17. The cross bar 12 is also thickened at its middle (see Fig. 4) and this thickened portion of the cross bar is formed with T-shaped slots in alinement with the T-shaped slots 17. Extending through these slots in these cross bars 14 and 12, are the vertical bars 18, which are T-shaped in cross section to fit the slots and which, at their lower ends, are angularly bent to form supporting hooks or brackets 19. The upper cross bar 10 is formed with a rib 20, this rib being cut away at the middle of the cross bar. Swingingly mounted upon the cross bar 10 and disposed in the cut-away portion of the rib 20, are the links 21, each of which is formed with an opening for the passage of the cross bar 10, this opening having a radially extending notch to permit the link to pass along the rib 20 from the end of the cross bar, and then be swung to a depending position with the notch out of alinement with the rib. The links are held in spaced relation to each other by means of a sleeve or collar 22, which is split so that it also may pass the rib 20 and be placed upon the cross bar 10.

The links 21 are pivotally connected to a bifurcated lever 23 whose two arms extend past the ends of the links and are pivoted thereto inward of the ends of the lever, as at 24.

Pivoted to the upper ends of the vertical bars 18, are the links 25 which, at their upper ends, are pivoted to the extremities of the forked branches of the lever 23. Thus it will be seen that when the lever 23 is turned upward as far as it will go, the rods 18 will be depressed to their full extent and that when the handle of the lever is drawn downward so that it bears against the cross bar 14, the rods 18 will be lifted. It will further be seen that at this time the pivotal connection of the links 25 to the levers will be to one side of the pivotal connection of the levers to the links 21, and hence that any weight on the hooks 19 will not act to raise the lever to its uppermost position, but will force the lever handle against the cross bar 14.

Slidingly mounted upon the cross bar 10, are collars 26, the apertures of which are formed with notches for the reception of the rib 20, and these collars are formed with outwardly extending arms or fingers 27 extending in a plane parallel to the plane of the hooks 19. These collars are slidable longitudinally upon the cross bar 10, but cannot rotate thereon, and are held in adjusted positions by means of set screws 28.

Mounted upon the cross bar 14 for adjustment toward or from each other, are brackets 29. These brackets are relatively wide at their inner ends and are formed with longitudinally extending slots 30 through which pass the set bolts 31, which pass through the slots 16 of the cross bar. By this means, these brackets may be shifted toward or from each other and then locked in their shifted or adjusted positions to thus increase or decrease the distance between the cross bars. Preferably, though not necessarily, the brackets are provided with the slots 30 as heretofore described, and in this case the under faces of the brackets are formed with downwardly extending lugs 32 so spaced from each other that the lugs will interlock with the side walls of the channel iron 14. Thus, upon releasing the set bolt 31, the brackets may not only be shifted toward or from each other, but the brackets may be shifted outward or inward and then locked in their shifted positions. Each of the plates or brackets 29 is formed with a pair of upwardly extending ears 33 at one end, and an upwardly extending ear 34 at its other end. Passing through these ears is a latch rod 35 which is rotatably mounted in the ears and which is screw-threaded, as at 36, at one end for engagement with a nut 37 which is disposed between the ears 33. Inward of this nut 37, the rod 35 is formed with a radially projecting arm 38, the inner face of which is inclined or obliquely disposed with relation to the axis of the rod 35. The opposite end of the rod 35 from the screw-threaded portion 36 is formed with a handle 39 whereby the rod may be rotated, and a coil spring 40 acts to rotate the rod in a direction to cause the arm 38 to extend laterally in a more or less horizontal plane. Now, when this device is in use, these latches extend into the radiator section between the outer coils and these locking arms or members 38, when they are turned laterally, will engage behind the coils and thus lock the truck or carriage to the radiator. By turning the shafts 35 to carry the members 38 into a vertical position, the latches may be readily withdrawn from their engagement with the radiator. It will be seen that by rotating the nut 37, the shafts or rods carrying the latch arms 38 may be longitudinally shifted so as to adjust them to radiator sections of various depths, and that furthermore the brackets themselves may be shifted to accomplish this end. Thus a maximum projection of the latch rods or shafts 35 may be secured for radiators whose coils are very deep.

In the use of this device, if it be desired to move any radiator, two of these carriages are used and moved up against opposite ends of the radiator so that the fingers 27 will be in line with the vertical spaces between the coils of the radiator and with the brackets 29 also arranged to project into these spaces. At this time, the hooks 19 are lowered and each carriage is shifted toward the end of the radiator, the latch arms 38 being turned to a vertical position. When the carriage is forced inward into full engagement with the radiator, the latch rods or shafts 35 are released, whereupon the latch arms or members 38 will be rotated so that the inclined faces thereof will engage against the coils of the radiator, thus locking the radiator firmly in place against the carriage. Then the levers 23 of the two carriages are turned downward, thus causing the lifting up of the hooks 19 and the lifting up of the radiator, and inasmuch as the two carriages are locked to the ends of the radiator, it will be obvious that the radiator will be mounted upon a truck or carriage whereby it may be shifted to any desired position and again lowered on the floor, or kept in a raised position.

It will be seen that this device is very convenient for the purpose intended, and that because of the adjustments of the several parts, it can handle practically any style of radiator. It is obvious that I do not wish to be limited to the particular means for adjusting the brackets 29, or to the use of these brackets, or to the particular form of latch, or to any of the details of construction, as it is obvious that these details may be modified in many ways without departing from the spirit of the invention.

We claim:—

1. A carriage for the purpose described comprising a wheel supported frame, a vertically movable supporting member carried upon the frame, manually operable means for raising or lowering the supporting member and locking it in its raised position, a latch operatively mounted upon the frame and adapted to engage between the coils of a radiator to hold the radiator to the carriage, said latch including a manually rotatable shaft, and a latching projection extending from the shaft.

2. A carriage for the purpose described comprising a frame having supporting wheels at one end, vertically movable supporting members mounted upon the frame, manually operable means for raising or lowering the supporting members and locking them in their raised position, and latches projecting from the frame and adapted for engagement with the coils of a radiator to latch the carriage to the radiator, said latches being adjustably mounted upon the frame for movement toward or from each other.

3. A carriage for the purpose described comprising a frame having vertical legs, caster wheels mounted on the frame, vertically movable rods mounted upon the frame and having supporting hooks adapted to engage beneath a radiator, manually operable means for raising or lowering said rods and locking them in their raised positions, and latches operatively mounted upon the frame and adapted to engage between the coils of a radiator to hold the radiator to the carriage.

4. A carriage for the purpose described comprising a frame having vertical legs and cross bars connecting said legs at a plurality of points, caster wheels mounted on the lower ends of the legs, vertically movable rods mounted upon certain cross bars of the frame and having supporting hooks adapted to engage beneath a radiator, manually operable means for raising or lowering said rods and locking them in their raised positions, latches operatively mounted upon the frame and adapted to engage between the coils of a radiator to hold the radiator to the carriage, said latches including manually rotatable shafts extending parallel to the hook-shaped portions of the rods, and latching arms carried by said shafts.

5. A carriage for the purpose described comprising a frame having vertical legs and cross bars connecting said legs at a plurality of points, caster wheels mounted on the lower ends of the legs, vertically movable rods mounted upon certain cross bars of the frame and having supporting hooks adapted to engage beneath a radiator, manually operable means for raising or lowering said rods and locking them in their raised positions, latches operatively mounted upon the frame and adapted to engage between the coils of a radiator to hold the radiator to the carriage, said latches including manually rotatable shafts extending parallel to the hook-shaped portions of the rods, and latching arms carried by said shafts said shafts being longitudinally shiftable with relation to the frame whereby to space said latching arms a greater or less distance from the plane of the frame.

6. A carriage of the character described including a wheel supported frame, vertically shiftable rods mounted in said frame and having hook-shaped lower ends adapted to engage beneath the radiator, a lever operatively supported upon the frame and operatively connected to said rods to raise or lower the rods and lock them in their raised positions, brackets mounted upon the frame and adjustable toward or from each other, and latches rotatably mounted upon the brackets and adapted to engage with the coils of a radiator.

7. A carriage of the character described including a wheel supported frame having cross bars, vertically shiftable rods mounted in said cross bars and having hook-shaped lower ends adapted to engage beneath the radiator, a lever operatively supported upon the frame and operatively connected to said rods to raise or lower the rods and lock them in their raised positions, brackets mounted upon one of the cross bars of the frame and adjustable toward or from each other, latches rotatably mounted upon the brackets and adapted to engage with the coils of a radiator, and members mounted upon one of the cross bars of the frame above the brackets and projecting in the same direction and adjustable toward or from each other.

8. A carriage of the character described comprising a frame provided with downwardly extending legs, an upper bar, a lower cross bar, and a middle cross bar, caster wheels mounted on the lower ends of the legs, vertically shiftable rods mounted in the middle and lower cross bars and having angularly bent lower ends forming supporting hooks, links swingingly mounted upon the upper cross bar, a lever forked to provide two branches embracing the lower ends of the links, the lever being pivoted to said links inward of its upper end, and links pivotally connecting the upper ends of the branches to the vertically shiftable rods.

9. A carriage of the character described comprising a frame having laterally disposed legs, an upper, a lower and a middle cross bar, rods having angular lower ends slidingly mounted in the lower and middle cross bars, a lever operatively supported upon the upper cross bar operatively engaging said rods to raise or lower them and lock the rods in their raised positions, brackets mounted upon the middle cross bar and adjustable toward or from each other, shafts rotatably mounted in the brackets and longitudinally shiftable therein, said shafts being screw-threaded for a portion of their length and having radially projecting arms, handles whereby the shafts may be turned to carry said arms from a vertical to a horizontal position, and nuts mounted in the brackets and engaging the screw-threaded portions of the rods whereby the rods may be longitudinally adjusted.

10. A carriage for the purpose described comprising a wheel supported frame, vertically movable supporting members carried upon the frame, manually operable means for raising or lowering the supporting members, and latches mounted upon the frame for adjustment toward or from each other and adjustment in directions parallel to each other, each of said latches including manually rotatable shafts, and latching arms carried by said shafts.

11. A carriage for the purpose described comprising a wheel supported frame, vertically movable supporting members carried upon the frame, manually operable means for raising or lowering the supporting members and locking them in their raised positions, a member mounted upon the frame for longitudinal adjustment relative thereto toward or from the wheels of the frame, and rotatable latches mounted upon said member and having radially projecting portions adapted to engage with the coils of a radiator to latch the carriage to the radiator.

12. A carriage for the purpose described comprising a wheel supported frame, vertically movable supporting members carried upon the frame, manually operable means for raising or lowering the supporting members, a member adjustable upon the frame toward or from the wheels thereof, brackets adjustably mounted upon said member, and rotatable latches mounted upon said brackets and having radially projecting portions adapted to engage behind the coils of a radiator to latch the carriage to the radiator.

13. A carriage for the purpose described comprising a wheel supported frame, vertically movable supporting members carried upon the frame, manually operable means for raising or lowering the supporting members and locking them in their raised positions, and latches operatively mounted upon the frame and projecting at right angles to the plane thereof, said latches including manually rotatable shafts having radially projecting portions, said portions having inclined edge faces extending toward the shaft and toward the frame.

14. A carriage of the character described comprising a frame having an upper cross bar, wheels supporting the frame, vertically shiftable supporting members mounted upon the frame, a lever operatively connected to said vertically shiftable, supporting members, a link swingingly mounted upon the cross bar and operatively connected to the lever, said cross bar having alined ribs spaced from each other, a link having a sleeve formed with a slot to accommodate said rib, the sleeve having a length equal to the distance between the ribs, said ribs terminating short of the outer ends of the cross bar, and collars slidingly mounted on the cross bar and with which said ribs engage and having fingers projecting outward from the collars and at right angles to the plane of the frame.

In testimony whereof we hereunto affix our signatures in the presence of two witnesses.

CHARLES LE TEMPT.
HENRY W. GREEN.

Witnesses:
J. H. MALLONEE,
H. O. MURPHY.